(12) United States Patent
Ortiz Santini et al.

(10) Patent No.: US 12,533,931 B2
(45) Date of Patent: Jan. 27, 2026

(54) SYSTEM AND METHOD FOR MONITORING AND PURGING ATMOSPHERE IN A CONFINED SPACE

(71) Applicant: Whiskey Lima Corporation, Pompano Beach, FL (US)

(72) Inventors: Lionel Valentin Ortiz Santini, Pompano Beach, FL (US); Nelson Juan Ortiz Santini, Columbia, MD (US)

(73) Assignee: WHISKEY LIMA CORPORATION, Pompano Beach, FL (US)

( * ) Notice: Subject to any disclaimer, the term of this patent is extended or adjusted under 35 U.S.C. 154(b) by 0 days.

(21) Appl. No.: 19/176,559

(22) Filed: Apr. 11, 2025

(65) Prior Publication Data

US 2025/0319745 A1    Oct. 16, 2025

Related U.S. Application Data

(60) Provisional application No. 63/633,626, filed on Apr. 12, 2024.

(51) Int. Cl.
    *B60H 1/24*      (2006.01)
    *B60H 1/00*      (2006.01)

(52) U.S. Cl.
    CPC ......... *B60H 1/248* (2013.01); *B60H 1/00364* (2013.01)

(58) Field of Classification Search
    CPC ............ B60H 1/00879; B60H 1/00821; B60H 1/00364; B60H 1/00564; B60H 1/00735; B60H 1/00849; B60H 1/008; B60H 1/00835; B60H 1/242; B60H 1/244
See application file for complete search history.

(56) References Cited

U.S. PATENT DOCUMENTS

| | | | | |
|---|---|---|---|---|
| 6,746,323 | B1* | 6/2004 | Digby, Jr. ............ | B60H 1/3232 454/91 |
| 11,827,077 | B2* | 11/2023 | Bryant ................. | B60H 1/3202 |
| 11,933,503 | B2* | 3/2024 | Markert ................. | F24F 5/001 |
| 12,030,365 | B2 | 7/2024 | Voss | |
| 12,043,089 | B2 | 7/2024 | Grewe | |
| 2010/0170277 | A1* | 7/2010 | Schmitt ............. | H05K 7/20745 165/104.34 |
| 2011/0269388 | A1* | 11/2011 | Meulenbelt .......... | B60H 1/3202 454/76 |
| 2014/0260965 | A1* | 9/2014 | Finkam ................. | B01D 53/30 95/12 |
| 2014/0273786 | A1* | 9/2014 | Wade ................. | B60H 1/00735 454/75 |
| 2017/0330044 | A1* | 11/2017 | Telpaz ................... | B60K 35/10 |

(Continued)

*Primary Examiner* — Ko-Wei Lin
(74) *Attorney, Agent, or Firm* — The Concept Law Group, PA; Scott D. Smiley; Scott M. Garrett

(57) ABSTRACT

A purge system for a box trailer used for overland cargo transport includes there being an exhaust vent at a front end of the trailer, and one or more fresh air vents at the rear end of the trailer. Fresh air or conditioned air is introduced into the trailer through the fresh air vents, and the interior air is exhausted through the exhaust vent. An exhaust fan at the exhaust vent is controlled by a control module, which receives information from various sensors regarding conditions inside the trailer, and initiates the purge operation in response to one or more of the monitored parameters meeting or exceeding an established threshold.

19 Claims, 13 Drawing Sheets

(56) References Cited

U.S. PATENT DOCUMENTS

| | | | |
|---|---|---|---|
| 2019/0212033 A1* | 7/2019 | Consadori | F24H 1/009 |
| 2020/0070627 A1* | 3/2020 | Sakai | B60N 2/0024 |
| 2021/0094385 A1* | 4/2021 | Lerner | B60H 1/00657 |
| 2021/0310670 A1* | 10/2021 | Markert | B60H 1/00014 |
| 2021/0362567 A1* | 11/2021 | Koelsch | B60H 1/00428 |
| 2024/0190270 A1* | 6/2024 | Seko | B62M 7/02 |
| 2024/0190672 A1 | 6/2024 | Boerger et al. | |
| 2024/0239152 A1* | 7/2024 | Hirata | F25D 11/003 |

\* cited by examiner

SYSTEM AND METHOD FOR MONITORING AND PURGING ATMOSPHERE IN A CONFINED SPACE

CROSS-REFERENCE TO RELATED APPLICATION

This application claims priority to U.S. Provisional Patent Application No. 63/633,626 filed Apr. 12, 2024, the entirety of which is incorporated by reference.

FIELD OF THE INVENTION

The present disclosure relates generally to workplace safety and health, and, more particularly, relates to automated monitoring and purging the air in a confined space such as a dry van or shipping trailer/container, prior to opening the space to allow worker into the space for moving articles into or out of the space, in order to avoid exposing workers to air at hazardous conditions in the shipping trailer, as well as avoiding dumping hazardous air from the shipping trailer/container into the workplace environment.

BACKGROUND OF THE INVENTION

Trucks, trailers, containers, and dry vans are used to transport a large amount of goods in commerce. Goods are moved from ports and factories to warehouses, distribution centers, and retail locations. In the United States it is common for trucks to haul an enclosed "box" trailer of one of several standardized sizes. For example, box trailers configured in a semi arrangement, which do not have a front axle, typically have a length of between forty-eight and fifty-three feet, a width of eight and a half feet, an inside height of about eight to nine feet, and an outside height (from the ground to the roof) of about twelve to thirteen and a half feet. Although those are common dimensions, there can be a substantial variation in length, and some variation in width and height among box trailers. This represent a significant internal volume. Given that trailers are often hauled long distances, the trailer is subject to sunlight and heat in certain times of the year, and more so in regions closer to the tropics and sub-tropic regions. As a result, it is not unusual for the temperature of the air inside of a trailer to reach uncomfortably high levels, if not actually hazardously hot. As is well known, exposure to elevated temperatures can cause fatigue, or even worse health effects.

In addition, at a shipping facility, such as warehouse or distribution center, it is not unusual to have ten to two hundred docking stations for trailers to be loaded or unloaded. The trailers are backed up to a door at dock that provides immediate access to the interior of the structure, which is typically climate controlled (e.g. temperature and humidity). The constant opening of hot trailers along these dock can dump large volumes of heated air into the facility, which could affect worker health, as well as stress the climate control refrigeration equipment. At a minimum, all that hot air causes the air conditioning equipment of the facility to work more that it would it the air in the trailers were not heated due to climactic conditions. In some jurisdictions there are regulations on the workplace conditions related to heat injury, and the heated containers and trailers can produce non-compliant, hazardous, and even life-threatening conditions for personnel that must work inside, or in proximity to these enclosed spaces. Warehouse owners and operators implement a multitude of heating, ventilation, and air conditioning (HVAC) measures to create acceptable climate-controlled conditions inside warehouses for warehouse workers, including cross ventilation, ceiling and floor fans, air conditioning, and other measures. But there are no known measures to effectively exhaust the unconditioned air from dry vans, trailers, and other shipping containers before opening them to warehouses or other facilities, nor to replace the container air with other air that is of equal or better quality to that of the connected facility space. As an example, a million-square-foot warehouse operating 200 dock doors connecting to 53-foot-long box trailers, that are empty and to be loaded, can be subject to 800,000 cubic feet of unconditioned air that then has to be conditioned to prevent an undesirable work environment from developing inside the warehouse.

Therefore, a need exists to overcome the problems with the prior art as discussed above.

SUMMARY OF THE INVENTION

The shortcomings of the prior art are overcome and additional advantages are provided through the provision of a system and method of replacing a hazardous air mass within a confined, space such as a closed trailer, with an alternative air mass that is safe and comfortable. Some embodiments of the inventive disclosure include a method of monitoring conditions inside the trailer or enclosed space to determine the need to replace the air mass with a more preferable one. If that determination is made, an exhaust fan mounted through a side of the container/trailer is enabled and the air mass is discharged to the exterior of the container/trailer. At the same time, ventilation grills are activated to allow the exhaust depressurization to induce relief air from the outside, or from a connected building, into the trailer. The process is halted when the interior conditions in the trailer are equivalent to the selected ambient or connected building conditions. The trailer door is then opened for entry of personnel that must offload and/or load cargo. In this fashion, the exposure of personnel to hazardous trailer conditions and the infiltration of those conditions into the connected buildings are avoided.

In accordance with some embodiments of the inventive disclosure, there is provided a container fast purge system for a container, the container having a first side and a second side opposite the first side, a first end and a second end opposite the first end, and the first side and the second side extend from the first end to the second end. The fast purge system includes an exhaust vent through the first side at the first end of the container and positioned adjacent a ceiling of the container and an exhaust fan positioned at the exhaust vent. There is at least one fresh air vent through a portion of the container at the second end of the container, and a temperature sensor disposed inside the container that is configured to provide a signal that indicates a temperature inside the container. There is a controller that is responsive to the signal of the temperature sensor to operate the exhaust fan until the temperature inside the container has decreased by a preselected amount or to a preselected temperature.

In accordance with s further feature, the at least one fresh air vent comprises a pressure operated vent that opens in response to a there being a lower pressure inside the container than outside the container.

In accordance with s further feature, there is further included a wireless local radio communications transceiver operably coupled to the controller, and a portable computing device that is configured to communicate with the wireless local radio communications transceiver to receive status information from the controller and to transmit operational commands to the controller.

In accordance with s further feature, there is further included a camera mounted in an interior of the container, wherein the controller receives photographic information from the camera and transmits the photographic information to a portable communication device via the wireless local radio communications transceiver.

In accordance with s further feature, the at least one fresh air vent is configured, at an outside of the container, to connect to an external duct.

In accordance with s further feature, there is further included a door switch operably coupled to the controller which indicates to the controller whether a door of the container is open or closed.

In accordance with s further feature, there is further included an external temperature sensor mounted on an outside of the container and that is operably coupled to the controller to indicate an external temperature to the controller, and wherein the controller is further configured to operate the exhaust fan when a temperature different between the external temperature and an internal temperature exceeds a preselected threshold.

In accordance with s further feature, there is further included a gas sensor that is configure to sense a level inside the container of at least one gas and provide a signal to the controller indicating the level of the at least one gas.

In accordance with s further feature, there is further included a duct positioned in the container at a ceiling of the container, the duct having a front end coupled to the exhaust vent, a rear end located at the second end of the container, a rear intake vent at the rear end of the duct, and at least one intermediate intake vent in the duct between the front end and the rear end of the duct.

In accordance with some embodiments of the inventive disclosure, there is provided a box trailer fast purge system that includes a duct that has a front end near a front end of the box trailer, and a rear end of the duct near a rear end of the box trailer. The duct has an intake vent at the rear end of the duct, and an exhaust vent through a side of the box trailer at the front end of the duct at the front end of the trailer. There is an exhaust fan positioned at the exhaust vent to move air through the duct. There is also at least one intermediate intake vent on the duct between the front end of the duct and the rear end of the duct. There is at least one fresh air vent through a portion of the box trailer at the rear end of the box trailer. The system also includes a temperature sensor disposed inside the box trailer that is configured to provide a signal that indicates a temperature inside the box trailer. There is a controller that is responsive to the signal of the temperature sensor to operate the exhaust fan until the temperature inside the box trailer has decreased by a preselected amount or to a preselected temperature.

In accordance with a further feature, the at least one intake vent comprises a pressure operated vent that opens in response to a there being a lower pressure inside the box trailer than outside the box trailer.

In accordance with a further feature, there is also included a wireless local radio communications transceiver operably coupled to the controller, and a portable computing device that is configured to communicate with the wireless local radio communications transceiver to receive status information from the controller and to transmit operational commands to the controller.

In accordance with a further feature, there is further included a camera mounted in an interior of the box trailer, wherein the controller receives photographic information from the camera and transmits the photographic information to a portable communication device via the wireless local radio communications transceiver.

In accordance with a further feature, the at least one intake vent is configured, at an outside of the box trailer, to connected to an external duct.

In accordance with a further feature, there is further included a door switch operably coupled to the controller which indicates to the controller whether a rear door of the box trailer is open or closed.

In accordance with a further feature, there is further included an external temperature sensor mounted on an outside of the box trailer and that is operably coupled to the controller to indicate an external temperature to the controller, and wherein the controller is further configured to operate the exhaust fan when a temperature different between the external temperature and an internal temperature exceeds a preselected threshold.

In accordance with a further feature, there is further included a gas sensor that is configure to sense a level inside the box trailer of at least one gas and provide a signal to the controller indicating the level of the at least one gas.

In accordance with some embodiments of the inventive disclosure, there is provided a method of replacing undesirable environmental atmospheric conditions within a closed trailer, with desirable environmental conditions to safeguard building spaces and worker health before opening a trailer door of the trailer. The method includes monitoring at least one interior condition of the trailer and obtaining a parameter value indicating a state of the at least one interior condition, and comparing the parameter value to a preselected threshold value. When the parameter value meets or exceeds the preselected threshold value exhausting an interior air mass of the trailer while simultaneously drawing into the trailer a replacement air mass from outside the trailer. The method also includes stopping the exhausting when the parameter value subsequently changes to a preferred value, and opening the trailer for service by a user.

In accordance with s further feature, the method also includes transmitting the parameter value to a mobile device.

In accordance with s further feature, the at least one interior condition includes a temperature of the interior of the trailer.

Although the invention is illustrated and described herein as embodied in a purge system for a box trailer and similar cargo containers, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down," "left," "right," "inside," "outside," "front," "back," "head," "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first," "second," "third," and so on are only used for descriptive purposes and cannot be construed as indicating or implying relative importance.

In the description of the embodiments of the present invention, it should be noted that, unless otherwise clearly defined and limited, terms such as "installed," "coupled," "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances, these terms may include numbers that are rounded to the nearest significant figure. In this document, the term "longitudinal" should be understood to mean in a direction corresponding to an elongated direction of the article being referenced. To the extent that the disclosed invention utilizes computing resources, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequences of instructions designed for execution on a computer system. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
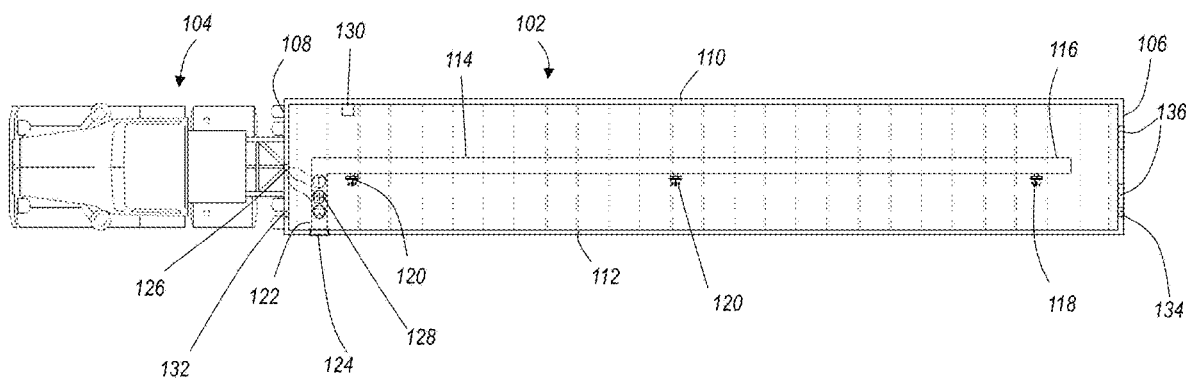
FIG. 1 is a top view of a truck system including a box trailer that includes a fast purge system for purging the atmosphere inside the box trailer with air from outside the box trailer, in accordance with some embodiments of the inventive disclosure.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient box trailer fast purge system that quickly removes air from a cargo box trailer to prevent exposing workers to undesirable conditions while unloading/loading the box trailer, as well as to prevent dispersing air from inside of a box trailer into a warehouse facility where workers are located. Embodiments of the invention provide a box trailer including a ventilation system that is automated or supervised to sense ambient conditions inside the box trailer, including temperature as well as other conditions, and purge the ambient air by exhausting it out of the box trailer while drawing in fresh air from outside of the box trailer. In addition, embodiments of the invention provide an elongated duct that runs from the rear of the box trailer to the front of the box trailer, along the roof of the box trailer. The duct terminates at the front end of the box trailer at a side of the box trailer through an exhaust vent in which there is an exhaust fan. At the opposite end of the box trailer, near the rear door, there is an intake vent in the duct, and there are one or more intermediate intake vents along the duct between the rear intake and the exhaust vents. There are also one or more fresh air vents located at the rear of the box trailer, near or in the rear door(s) of the box trailer. These fresh air vents open in response to a pressure differential created when the exhaust fan turns on, drawing fresh air into the box trailer through the fresh air vents. The exhaust fan is controlled in response to one or more sensors that sense ambient conditions inside the box trailer, and when the ambient conditions reach or exceed established threshold levels, the system activates the exhaust fan. The disclosed system can prevent, for example, adversely heated air being essentially dumped into a warehouse facility when the box trailer is backed up to a warehouse portal and the door of the trailer is opened. In a large warehouse operation, such as a distribution center, there can be hundreds of trailers being unloaded, and the cumulative effect of these trailers being opened at warehouse docks can have a negative effect on workers in the warehouse, as well as workers going into the trailers.

Figure 2:
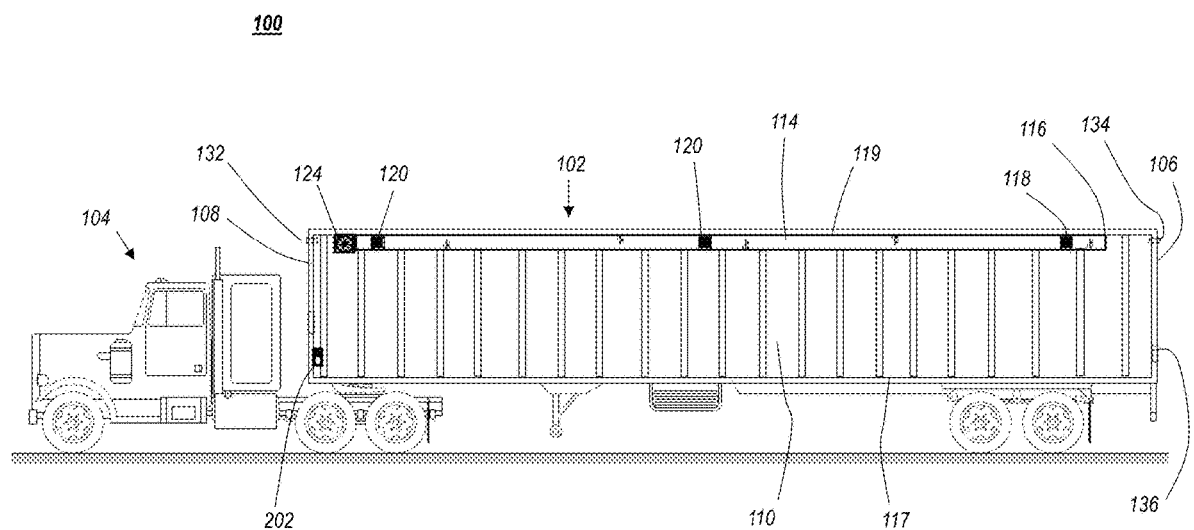
FIG. 2 is a side view of a truck system including a box trailer that includes a fast purge system for purging the atmosphere inside the box trailer with air from outside the box trailer, with a side of the box trailer removed to show components of the fast purge system, in accordance with some embodiments of the inventive disclosure.

FIG. 1 is a top view of a truck system 100 including a box trailer 102 that includes a fast purge system for purging the atmosphere inside the box trailer 102 with air from outside the box trailer 102, in accordance with some embodiments of the inventive disclosure. Reference should also be made to FIG. 2, which shows the same truck system 100 from a side view, with the near-side of the box trailer 102 removed to expose the inside of the box trailer 102.

For the purpose of discussion herein, a box trailer is an enclosed cargo compartment used to transport goods by truck, where the enclosed cargo compartment is sized to allow workers to walk into and work inside the cargo compartment, such as for loading and unloading goods into/from the cargo compartment. A common example is a trailer having an enclosed structure on the trailer with a door or doors at the rear of the trailer. These trailers are coupled to a truck unit 104 in what is referred to as a semi-trailer truck arrangement. Smaller "box trucks" equivalently have a box unit that is mounted on the chassis of the truck unit, rather than towed as a trailer. Box trucks are typically used for shorter hauls of good, such as for making deliveries in a local region, rather that long haul movement of goods for which semi-trailer truck systems are used. However, in certain climates, even box truck cargo compartments can experience undesirable conditions inside the cargo unit due to heating and other factors.

The box trailer 102 has a read end 106 and a front end 108. The front end is closest to the truck unit 104 and the box trailer 102 is coupled to the truck unit 104. There is also a first (right) side 110 and a second (left) side 112, along with a floor and roof. The sides 110, 112 are walls that are reinforced with vertical studs along the length of the sides 110, 112 from front to rear. FIG. 2 shows the box trailer 102 with side 112 removed such that inside of side 110 is in view. There is a door or doors at the rear end 106. There are either two swing doors that are each hinged on the opposite sides 110, 112, or a roll-up/retracting door system at the rear end 106 that can be opened to allow loading and unloading of the box trailer 102.

To achieve the fast purge operation, the box trailer 102 includes fresh air vents 136 in the rear door(s), and an exhaust fan at an exhaust vent 124 at a side of the box trailer 102 near the front end 108. When the exhaust fan is activated, air inside the box trailer 102 is exhausted out of the box trailer 102, and fresh air is pulled into the box trailer 102 through the fresh air vents 136. The fresh air vents 136 are positioned closer to the floor 117 of the interior of the box trailer 102, while the exhaust vent 124 is positioned near the ceiling 119 of the box trailer 102. In some embodiments the exhaust vent can be positioned at the ceiling 119, and the fresh air vents 136 can be positioned in the lower third of the height of the door(s) at the rear end 106 of the box trailer 102. The fresh air vents can have vanes or flaps that open in response there being a lower pressure inside the box trailer, as occurs when the exhaust fan is turned on. The higher outside pressure forces air into the box trailer through the fresh air vents 136.

While the positioning of the exhaust vent 124 and fresh air vents 136 allow a direction flow of fresh into the box trailer 102, it is known that the hottest air will be near the ceiling 119 of the box trailer. To further direct and optimize air flow, a duct 114 can be positioned along the ceiling 119 of the box trailer 102. The duct is terminated at the exhaust vent 124 at one end, and extends along the length of the box trailer 102 along the ceiling 119, to the rear end 106 of the box trailer 102. At the rear end of the duct 114, there is an intake vent 118, and along the length of the duct 114, there can be one or more intermediate intake vents 120 which are sized to ensure that there is adequate flow into the rear intake vent 118 when the exhaust fan at the exhaust vent 124 runs. The duct 114 includes a main portion that runs substantially the length of the box trailer 102, from front to rear, and is positioned along the ceiling 119, centered between the sides 110, 112, and has an angled portion 122 at the front end to join the main portion of the duct 114 with the exhaust vent 124.

When the exhaust fan in the exhaust vent 124 is activated, the air in the duct 114 is blown out of the exhaust vent 124, causing air around the duct intake vents 118, 120 to flow into the duct 114 and move towards, and eventually out of the exhaust vent. During this exhaust fan activation, fresh air is drawn in through the fresh air vents 136 from outside of the box trailer 102. By positioning the duct 114, and the intake vents 118, 120 at the ceiling 119, the hottest air is drawn out and exhausted from the box trailer first. The cooler fresh air being drawn in through the fresh air vents 136 will displace the hotter air in the box trailer, pushing it upwards to the intake vents 118, 120 to be exhausted from the box trailer 102 as well. Depending on the flow rate of the exhaust fan, the majority of the interior air of the box trailer 102 with undesirable characteristics (e.g. too hot) can be removed from the interior of the box trailer 102 in a matter of minutes. In some embodiments this can augmented by directing conditioned air into the fresh air vents 136.

The exhaust fan in the exhaust vent 126 is controlled by a control module 126, which is coupled to one or more sensors 128. Power is provided by a power system 130, which can be a battery, and include a solar cell array on top of the trailer, as well as an inverter so that both direct current (DC) and alternating current (AC) can be provided. The sensors 128 can include one or more of a temperature sensor ("T"), a humidity sensor ("H"), and a gas sensor such as a carbon monoxide sensor ("CO"). Each of the sensors 128 produces a signal that indicates a level of the parameter being sensed to the control module 126. A threshold value for each parameter can be programmed into the control module, and when that threshold is met or exceeded, the exhaust fan can be automatically activated by the control module 126 to lower that parameter of the air inside the box trailer 102. In addition to internal sensor(s) 128, there can be external sensors for similar parameters positioned at the outside of the box trailer so that differential thresholds can be established as well. For example, the exhaust fan can be activated either when the interior temperature sensed indicates a temperature of 120 degrees Fahrenheit, or when there is a 30-degree difference between the interior and exterior temperatures. The specific threshold can depend on the specific application.

The control module 126 can be operably controlled by either a control pad 202 that is positioned on the outside of the box trailer, or via a remote device (e.g. a cellular telephone device) using an antenna 132. The control module can include a wireless radio networking transceiver for local range, using an air interface such as those known by the trade terms WIFI and BLUETOOTH. A second antenna 134 at the rear of the box trailer can likewise facilitate wirelessly coupling to a device in a warehouse to control/supervise operation of the fast purge system. These antennas 132, 134 are externally mounted on the outside of the trailer, with a cable (e.g. a coaxial cable) connecting the antennas 132, 134 to the transceiver of the control module 126. The typical steel wall construction of shipping containers and trailer makes an effective Faraday cage, necessitating the external mounting of these antennas 132, 134.

Figure 3:
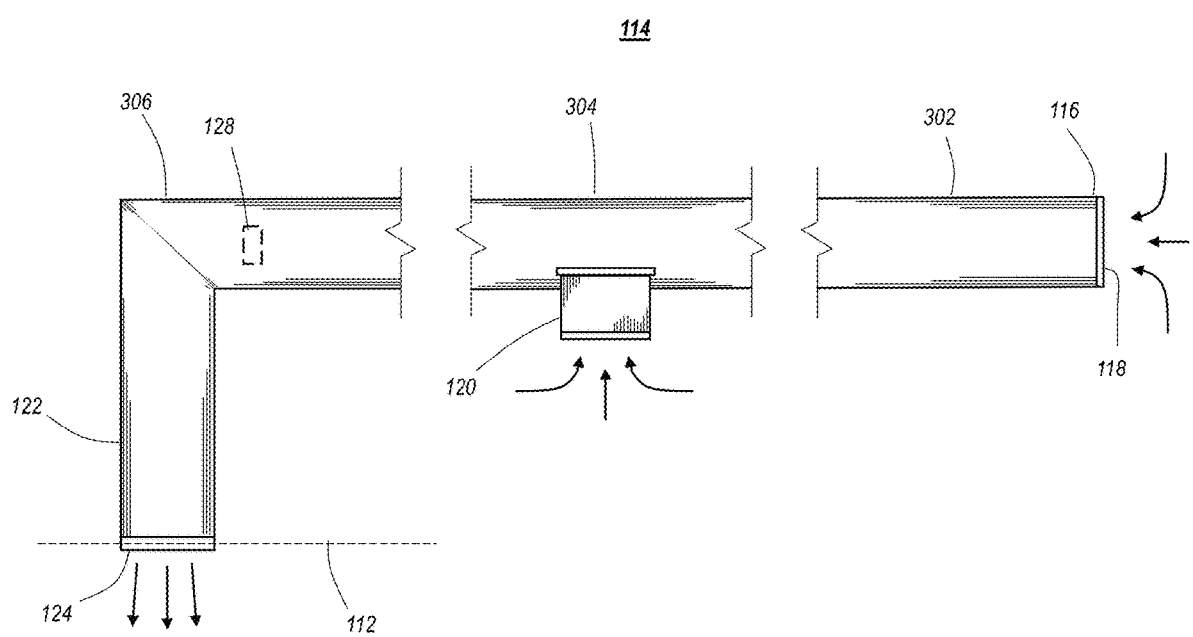
FIG. 3 is a top view of a duct for a box trailer fast purge system, in accordance with some embodiment of the inventive disclosure.

FIG. 3 is a top view of a duct 114 for a box trailer fast purge system, in accordance with some embodiment of the inventive disclosure. The duct 114 is broken up into a rear segment 302, intermediate segment 304, and front segment 306. At the rear segment 302 is the rear end 116 of the duct with a rear intake vent 118. The intermediate or middle segment 304 includes one or more intermediate intake vents 120. The front segment includes the angle portion 122 that turns from the main portion of the duct to the side 112 of the box trailer, through which an exhaust vent 124 passes. The exhaust vent 124 includes an exhaust fan, which when activated, blows air out of the exhaust vent 124 to the outside of the box trailer 102 as indicated by the arrows leading out of the exhaust vent 124. At the same time, air is drawn into the duct through intake vents 118, 120 as indicated by the arrows at those vents. One or more sensors 128 can be positioned in the duct 114, or outside of the duct 114 inside the box trailer 102.

Figure 4:
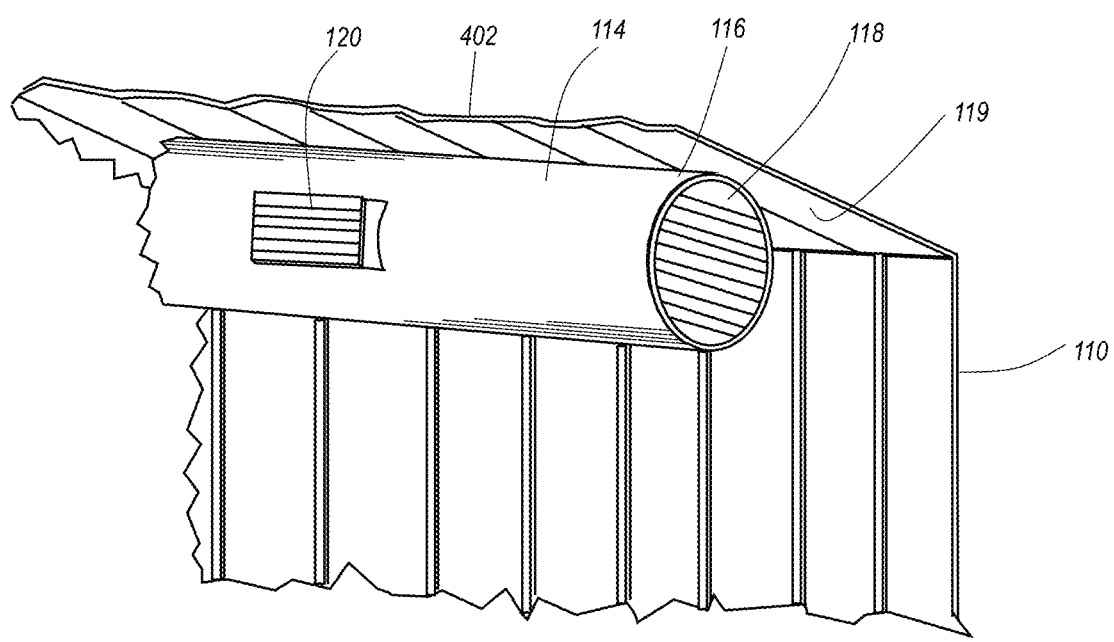
FIG. 4 is a perspective view inside a box trailer showing a duct for a fast purge system, in accordance with some embodiments of the inventive disclosure.

FIG. 4 is a perspective view inside a box trailer 102 showing a duct 114 for a fast purge system, in accordance with some embodiments of the inventive disclosure. Portions of the box trailer 102 have been omitted for clarity. The duct 114 runs along the ceiling 119, which is the interior side of the roof 402 of the box trailer 102. There is a rear intake vent 118 at the rear end 116 of the duct 114, and there is at least one intermediate intake duct 120 located along the main portion of the duct 114. The duct 114 can have a circular cross section as shown here, or a rectangular cross section. the intake vents 118, 120 can be generally centered between the sides (e.g. 110, 112) of the box trailer 102.

Figure 5:
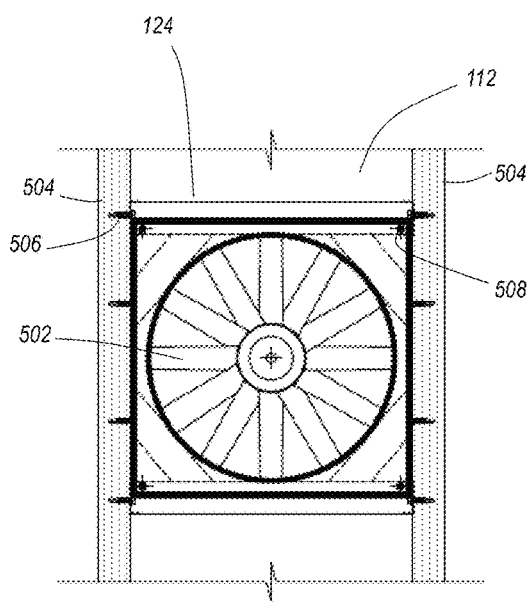
FIG. 5 is a side elevational view of an exhaust vent of a box trailer fast purge system, in accordance with some embodiments of the inventive disclosure.
Figure 6:
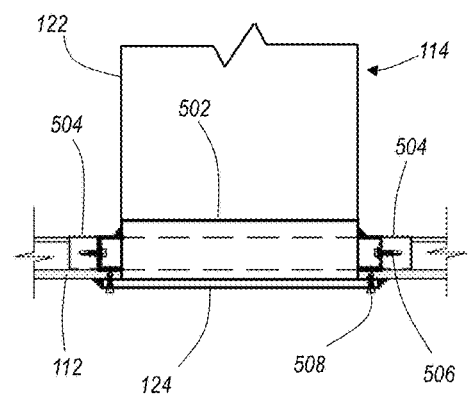
FIG. 6 is a top view of an exhaust vent of a box trailer fast purge system, in accordance with some embodiments of the inventive disclosure.

FIGS. 5 and 6 show details of the exhaust vent 124, wherein FIG. 5 is a side elevational view, and FIG. 6 is a top view of an exhaust vent of a box trailer fast purge system, in accordance with some embodiments of the inventive disclosure. The exhaust vent 124 is mounted through the side 112 of the box trailer near the front end of the box trailer, and near the ceiling 119 of the box trailer. The exhaust vent 124 includes an exhaust fan 502, and the exhaust vent 124 terminates the front end of the duct 114. The exhaust vent 124 can fit between two consecutive studs 504 in the side 112, with fasteners 506, 508 passing through fittings on the exhaust vent 124 and into the studs 502.

Figure 7:
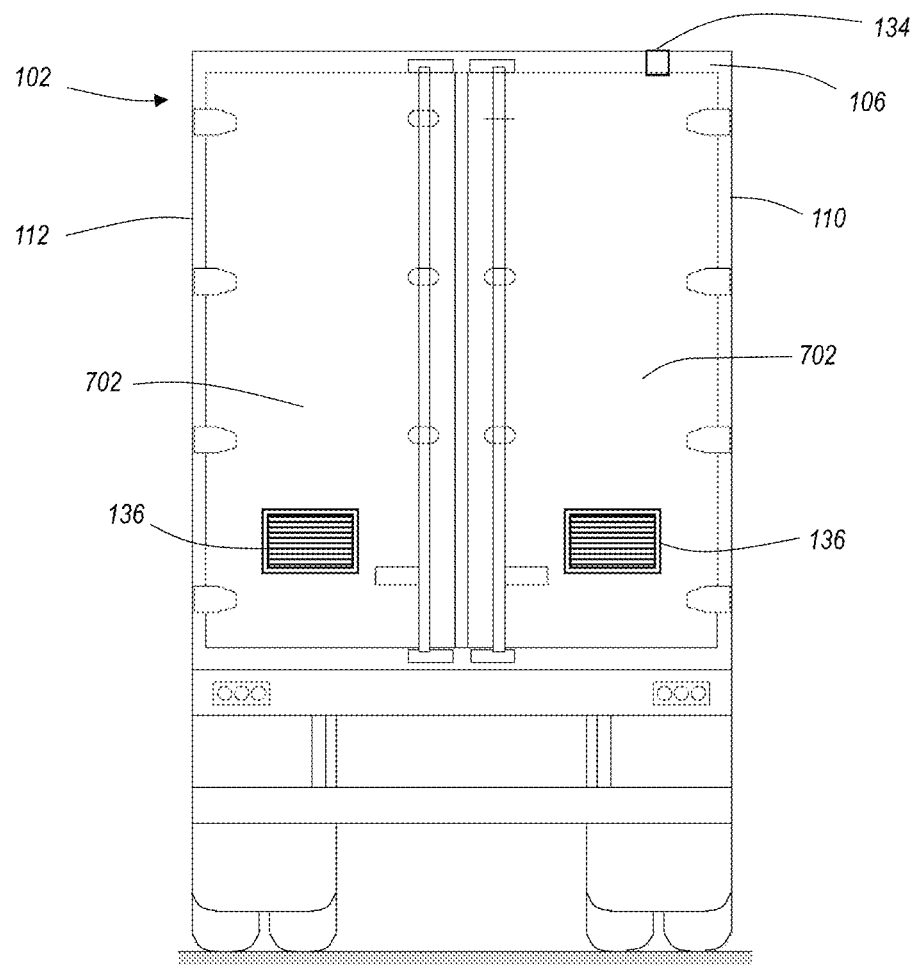
FIG. 7 is a rear view of a box trailer having swing doors with intake vents to allow air into the box trailer during a purge operation, in accordance with some embodiments of the inventive disclosure.
Figure 8:
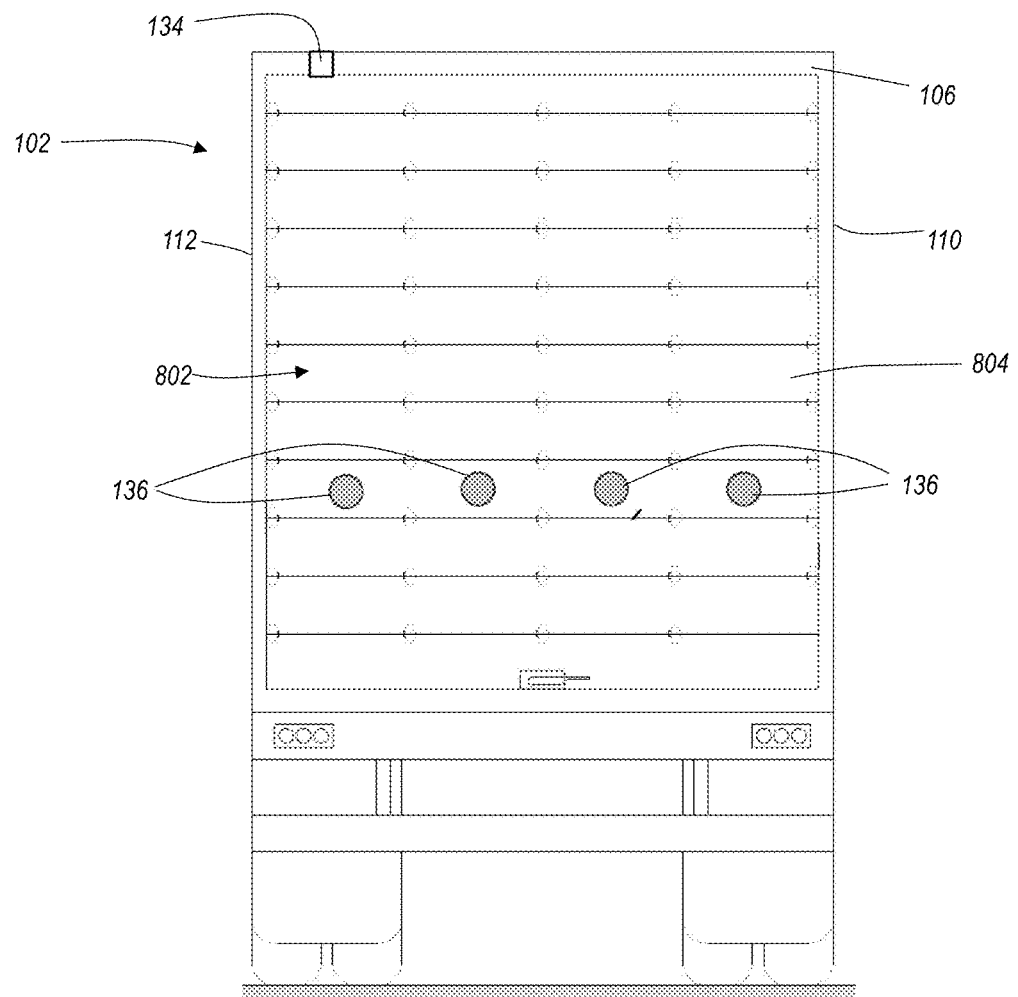
FIG. 8 is a rear view of a box trailer having a rolling door with intake vents to allow air into the box trailer during a purge operation, in accordance with some embodiments of the inventive disclosure.

FIGS. 7 and 8 show rear view of a box trailer in which there are different styles of doors. FIG. 7 is a rear view of a box trailer having swing doors 702, and FIG. 8 is a rear view of a box trailer having a rolling door 802, with both doors, 702, 802 having fresh air vents 136 to allow air into the respective box trailer during a purge operation, in accordance with some embodiments of the inventive disclosure. With the doors 702, 802 closed, the fresh air vents 136 are positioned within the lower third of the height of the doors 702, 802. In FIG. 7, with the swing doors 702, each swing door 702 can include a fresh air vent 136. The fresh air vents 136 in the swing doors can be larger in height that those used on the rolling door 802 because the rolling door 802 is made of a series of horizontally oriented slats 804 that have to lift up into a roll at the top of the rear end. The slats 804 are mounted on parallel tracks at each side 110, 112.

Figure 9:
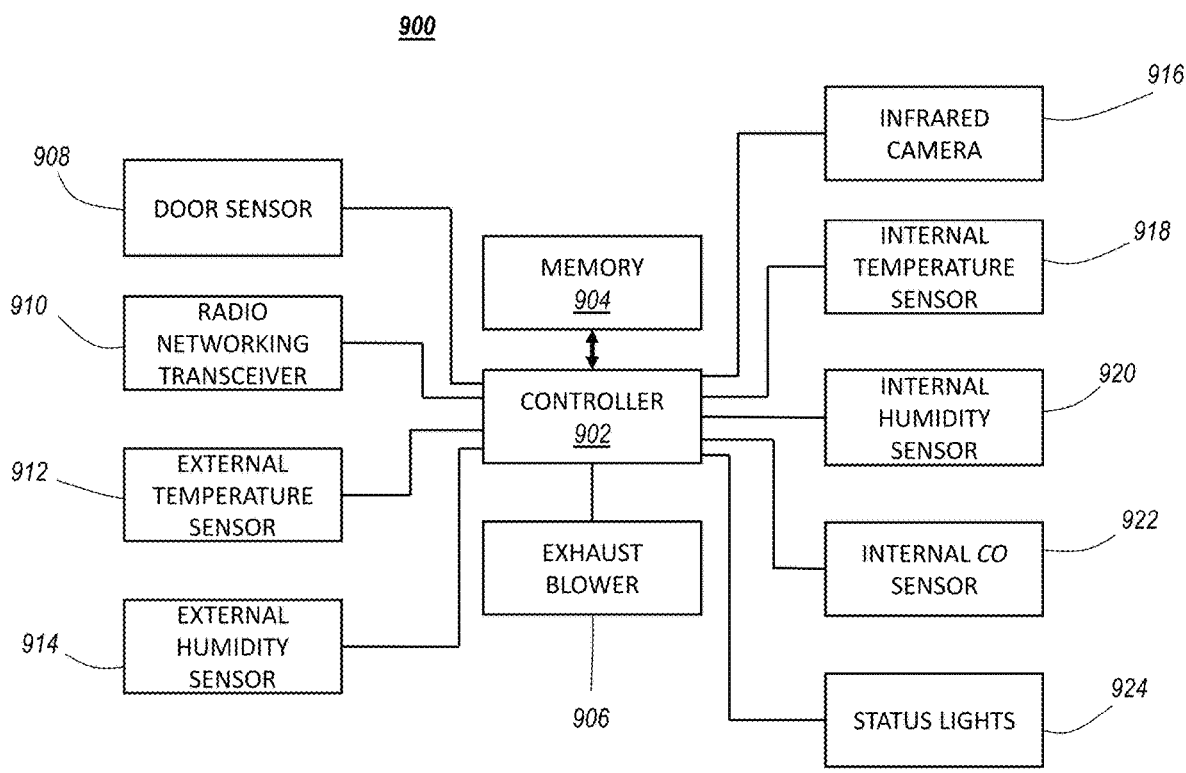
FIG. 9 is a block schematic diagram of the electrical system of a box trailer fast purge system, in accordance with some embodiments of the inventive disclosure.

FIG. 9 is a block schematic diagram of the electrical system 900 of a box trailer fast purge system, in accordance with some embodiments of the inventive disclosure. The control module 126 includes a controller 902 that is coupled to a memory 904. The controller 902 can be a programmable logic unit, microcontroller, microprocessor, or an equivalent. The memory 904 can include both volatile and non-volatile memory, including random access memory (RAM) and read only memory (ROM). Both instruction code and programmable variable for thresholds can be stored in memory and used during operation of the purge system. The control module 126 can include the controller 902, memory 904, as well as the radio networking transceiver 910 which can be coupled to front and rear antennas 132, 134. The radio networking transceiver can operate according to well-known local area or personal area radio networking protocols, such as those known by the trade names WIFI and BLUETOOTH. The controller 902 is coupled to the exhaust fan controls 906 and can provide at least an on/off signal that turns on or turns off the exhaust fan, accordingly. There can be an infrared camera 916 that provides a thermal based imaging of the interior of the box trailer. The images or video feed from the camera can be routed to other devices via the radio networking transceiver 910 for display on those devices. A door sensor 908 can be, for example, a simple switch that is activated by the rear door of the trailer being opened. In some circumstances opening the rear door may cancel the purge operation, or prevent it from starting.

An internal temperature sensor 918 provides a signal to the controller 902 that indicates the temperature inside the box trailer at the location of the internal temperature sensor 918. Accordingly, care must be taken as to where the internal temperature sensor 918 is located in the box trailer. It can be placed inside the duct 114, or outside the duct 114 near the ceiling 119 to indicate what is likely the hottest location in the box trailer. An external temperature sensor 912 can also be provided and used to trigger the purge operation based on a temperature differential threshold. The external temperature sensor 912 is positioned on the outside of the box trailer, preferably at the rear end of the trailer so that when the trailer is backed up to a warehouse port the external temperature sensor is sensing the ambient temperature of the warehouse. Similarly, there can be an internal humidity sensor 920 that provides a signal to the controller 902 that indicates a humidity level inside the box trailer. The internal humidity sensor can be used alone, or it can also be used to determine humidity differential by comparing the internal humidity level with the external humidity as indicated by an external humidity sensor 914 which is mounted on the outside of the box trailer.

In addition, it is further contemplated that a gas sensor or sensors can be used to detect the presence of unhealthy or toxic gasses in the box trailer. A common concern is the presence of carbon monoxide (CO) in box trailers, thus a carbon monoxide sensor 922 may be used to sense the level of carbon monoxide inside the box trailer. If the level rises to a given threshold, the controller 902 can commence a purge operation, as well as transmit an alert to any devices connected to the system 900 (e.g. via transceiver 910). It is further contemplated that the controller 902 can provide visual indication of the status of various sensed parameters (motion via camera 916, door open/closed, temperature, humidity, CO level, purge in process, and so on). It will be understood by those skilled in the art that the various sensors and other components can be coupled to the controller 902 by a variety of means, including by conductor wires and wireless connections as are well known.

Figure 10:
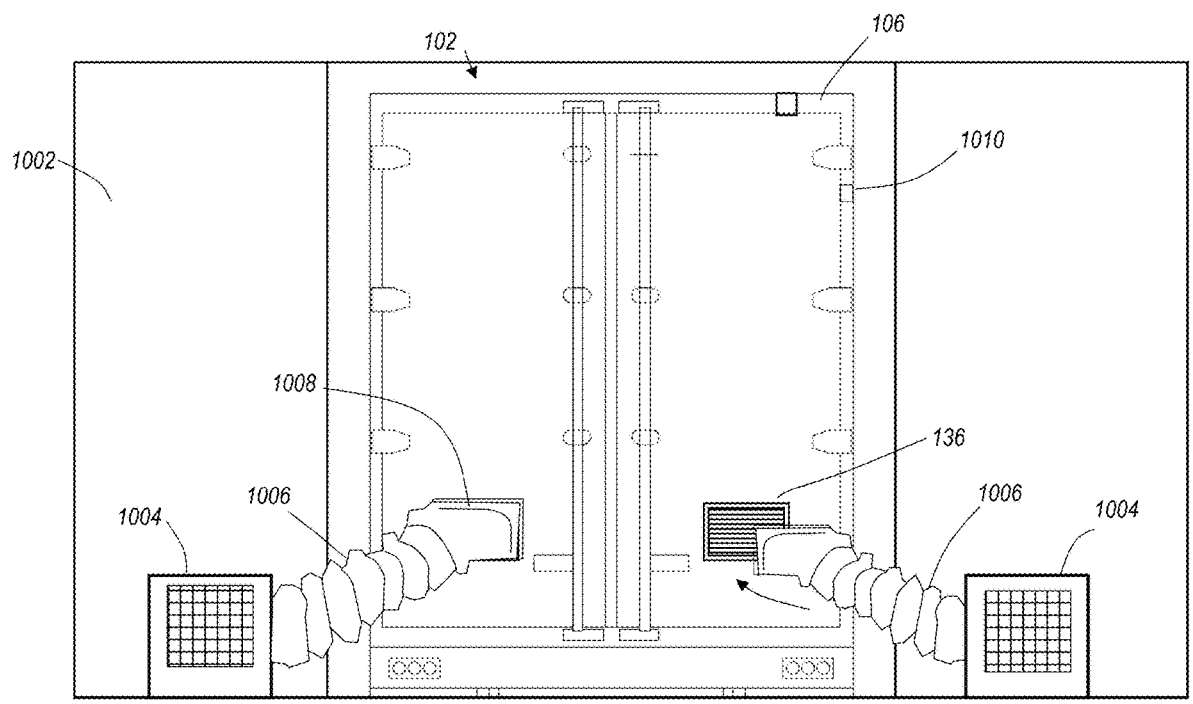
FIG. 10 is rear view of a box trailer that is backed up to a warehouse dock in which purging is augmented by a fan system in the warehouse, in accordance with some embodiments of the inventive disclosure.

FIG. 10 is rear view of a box trailer 102 that is backed up to a warehouse dock. The view here is from inside the warehouse 1002, and purging of the box trailer 102 is augmented by a fan system in the warehouse, in accordance with some embodiments of the inventive disclosure. In particular, there can be one or more fan units 1004, which blow ambient air from inside the warehouse 1002 through an external duct 1006 that is terminated with a connector 1008 that is configured to fit onto the fresh air vents 136. Upon backing up to the port of the warehouse 1002, the status of the interior of the box trailer 102 can be observed by connecting a terminal or mobile computing device to the control module 126 of the purge system which will then indicate to personnel in the warehouse 1002 whether the purge system has automatically initiated, how long it has been running if it has been started, what the ambient conditions are inside the box trailer, their change over time, and so on. The user can also control the purge system to start even the ambient conditions inside the box trailer 102 have not reached thresholds programmed into the control module 126. To facilitate the purge, the ducts 1006 can be connected to the fresh air vents 136, and the fan units 1004 enabled to blow air from the warehouse, through the ducts 1006, through the fresh air vents 136, and into the box trailer 102. Even if the exhaust fan 502 is not enabled, blowing air through the fresh air vents 136 will purge the air in the box trailer 102 through the exhaust vent 124. This system can be used with or with the duct 114 in the trailer, as well. Also in this view there is a door switch 1010 the indicates when the door is open, and by inference, closed.

Figure 11:
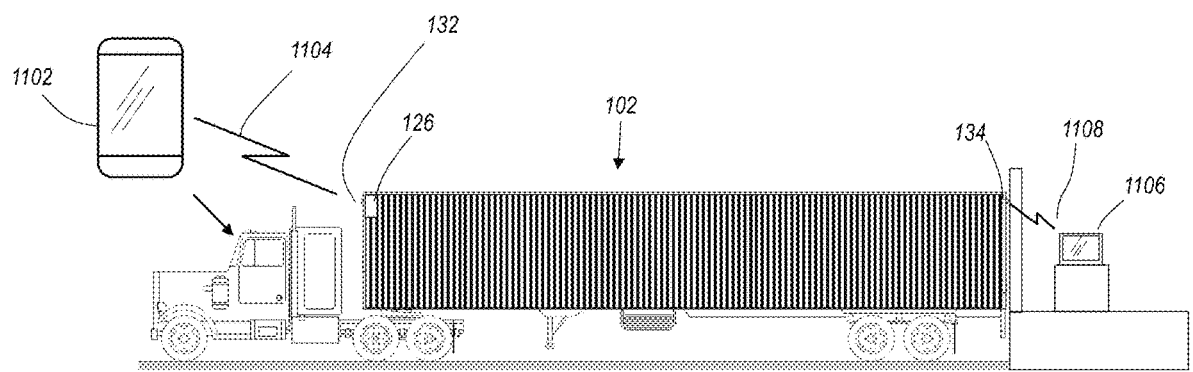
FIG. 11 is a side elevational view of a truck system having a box trailer that includes a fast purge system that can be operated using wireless devices, in accordance with some embodiments of the inventive disclosure.

FIG. 11 is a side elevational view of a truck system having a box trailer 102 that includes a fast purge system that can be operated using wireless devices, in accordance with some embodiments of the inventive disclosure. The operator of the truck system can have a mobile device 1102, or an equivalent system mounted in the cab of the truck unit. The mobile device can be, for example, a cellular telephone device capable or running application programs (e.g. a "smart phone"), or any equivalent portable communication device or portable computing device, or even a fixed computing station inside the truck unit. The mobile device 1102 runs an application program that is configured to communicated with, and control the fast purge system of the box trailer 102. The mobile device 1102 can be connected to the control module 126 of the purge system in the box trailer 102 via a local wireless network interface 1104 established between the mobile device 1102 and the control module 126 (via transceiver 910 and antenna 132). The operator of the truck unit can use the mobile device 1102 while in the cab of the truck unit to monitor conditions in the box trailer, and initiate a purge operation while in transit or when backed up to a warehouse or other such port. The control module 126 can also communicate with a warehouse station 1106 via a similar local wireless network link 1108, via antenna 134 at the back end of the box trailer. The warehouse station 1106 can be dedicated to a particular port of the warehouse such that there is a similar warehouse station at each port. Link 1108 allows the warehouse station 1106, which can be a computing device having wireless networking capability, to interact with the control module and monitor conditions inside the box tailer, and/or control operation of the purge system. Additional information may also be provided to the warehouse station 1106, such as trailer number, operator information, cargo information, and so on. Also, the warehouse station 1106 can provide information to the control module 126, such as the ambient conditions inside the warehouse.

Figure 12:
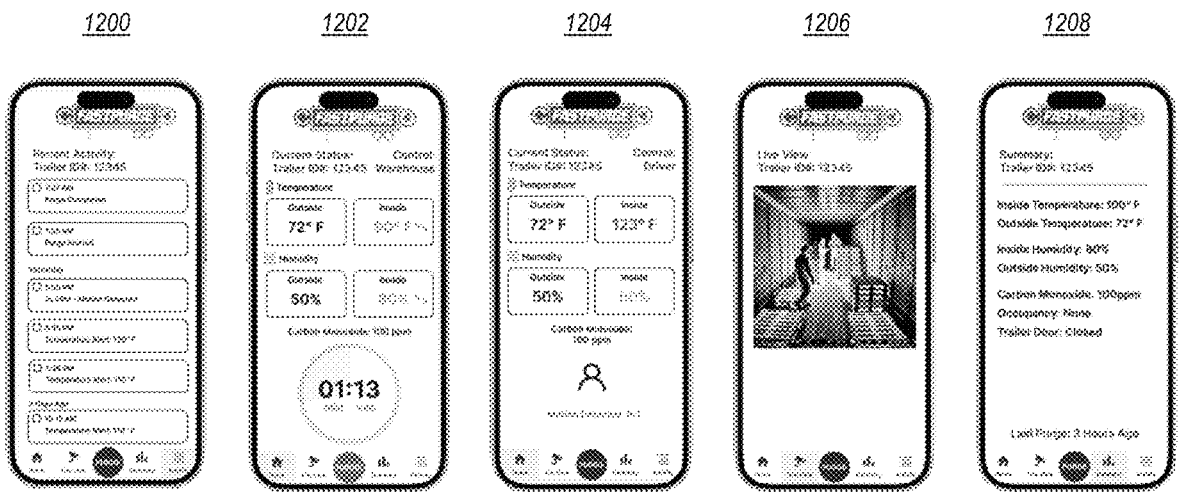
FIG. 12 shows several views of a user interface of a mobile device running an application program for interacting with, and controlling a fast purge system, in accordance with some embodiments of the inventive disclosure.

FIG. 12 shows several exemplary views of a user interface of a mobile device running an application program for interacting with, and controlling a fast purge system, in accordance with some embodiments of the inventive disclosure All of the interfaces 1200-1208 can be accessed in application program running on the mobile device via a menu presented on a main interface. In interface 1200, for example, the trailer identification number is shown, along with recent activity events over several days. At the bottom there is an event indicating that two days prior the temperature in box trailer reached 110 degrees F. On the day prior are the two temperature alarm events and one motion detection event. On the same day the application program was accessed there are events indicting a purge operation was commenced and then completed. Interfaces 1202 and 1204 are similar in that they both show certain parameters monitored by the purge system (temperature, humidity, carbon monoxide level). Interface 1202 is an interface presented at a warehouse station upon commencement of a purge operation. The inside temperature and humidity are shown, along with a trend icon indicating that the trend of these parameters are decreasing. Near the bottom of the interface 1202 is a clock indicating how long the purge process has been going on, and at the very bottom the PURGE icon is shown as activated, as indicated by the change of color (shade) relative to the other interface 1200, 1204, 1206 1208. The PURGE icon allows the operator of the device to press on the icon to initiate a purge process. Thus, operational commands can be transmitted to the control module via an interface of the mobile device or the warehouse station. Interface 1204 is for the same trailer as interface 1202, but is an interface on the truck operator's mobile device (e.g. the driver). The interface 1204 is shown prior to the commencement of the purge operation that is ongoing in interface 1202. The conditions are static as there is no trend icon. Note that the PURGE icon at the bottom of the interface is not indicating that the purge process is presently occurring as it is in interface 1202. In interface 1206 the view of the camera inside the box trailer is shown, allowing the user to monitor workers and temperature inside the box trailer since the camera is an infrared camera. The camera transmits photographic information such as images or video, which can then be routed to the mobile device. Interface 1208 is a general status interface, indicating inside and outside temperature and humidity, carbon monoxide level and door status, as well as time of the last purge operation. These interfaces 1200-1208 are intended as examples, and the designer of the application program can design similar interfaces showing the status of various parameters of the box trailer. There can also be interfaces for providing input, such as inputting the trailer identifier, threshold values for temperature, temperature differential, humidity, humidity differential, carbon monoxide or other gas levels, and so on. In addition, other information can be input such as the truck operator identification, the time that goods were loaded into the box trailer, and any other information that may be relevant. In addition, the control module 126 can record a record over time of the parameters being monitored so that, for example, a temperature versus time record can be maintained and then presented on an interface for examination to make sure the contents of the box trailer were not exposed to excessive temperature for any significant period of time.

Figure 13:
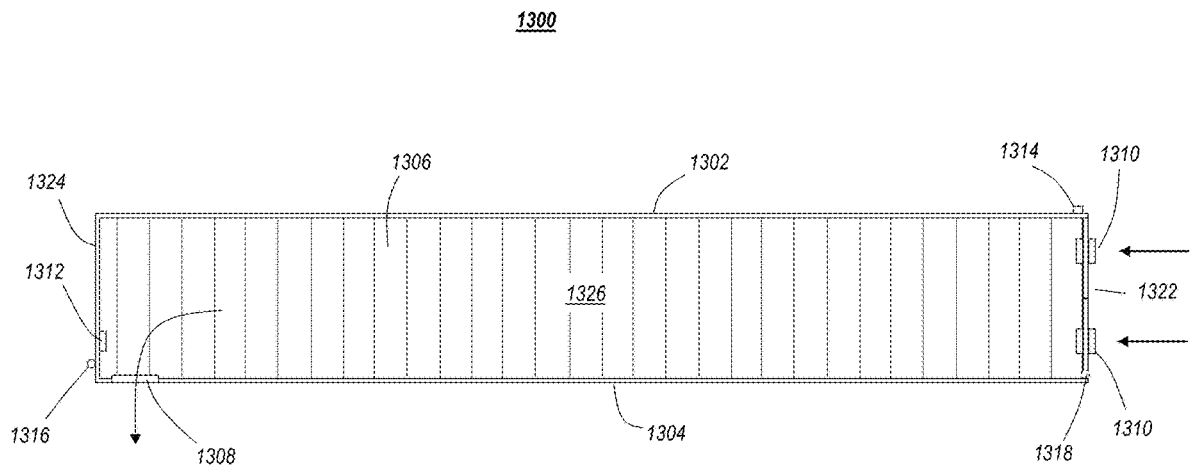
FIG. 13 is a top plan view of a box trailer having a purge system in a ductless arrangement, in accordance with some embodiments of the inventive disclosure.
Figure 14:
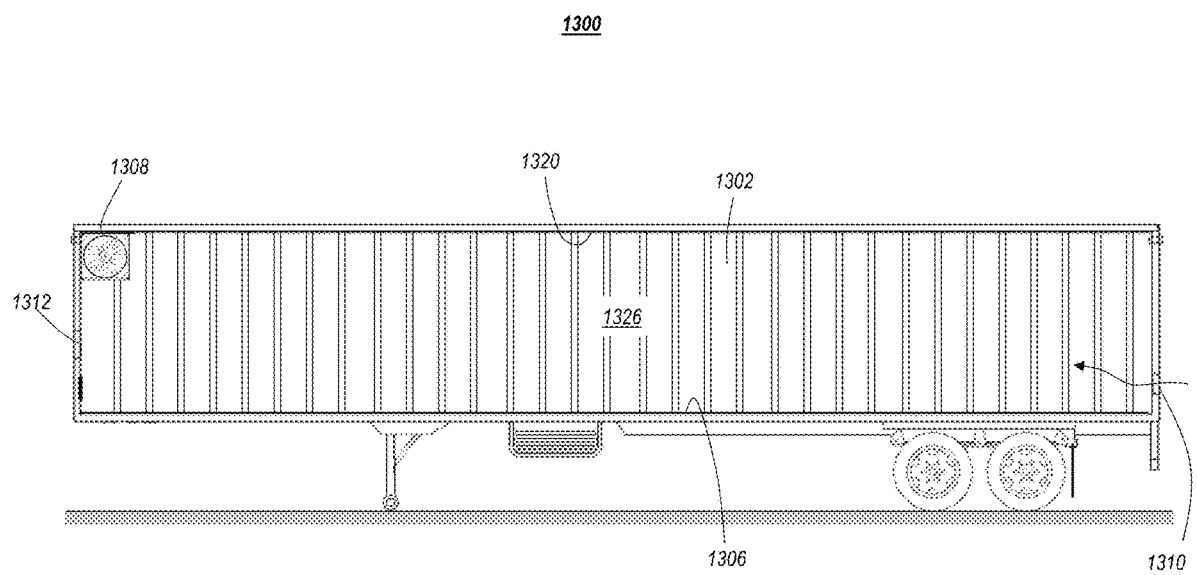
FIG. 14 is a side elevational view of a box trailer having a purge system in a ductless arrangement, in accordance with some embodiments of the inventive disclosure.

In the embodiments described herein above a duct is used in the container/trailer. It is also contemplated that a ductless purge system can be implemented in the container/trailer. As an example, FIG. 13 shows a top plan view of a box trailer 1300, where the top of the trailer 1300 has been removed to see inside of the trailer 1300, having a purge system in a ductless arrangement. FIG. 14 shows a side elevational view of the box trailer 1300 using a ductless purge system, where the near sidewall of the trailer 1300 has been removed in order to see inside the trailer 1300. In addition, the trailer 1300 is shown disconnected from a truck unit in these illustrations. It will be appreciated that the trailer 1300 is representative of a variety of containers in which people may have to enter to work, including loading and unloading goods, and the purge system described herein will function equivalently for different types of such containers. The trailer 1300 has a first (right) side wall 1302 and a second (left) sidewall 1304 with a floor 1306 between them. The side walls 1302, 1304, and floor 1306 run from a rear end 1322 to a front end 1324. The rear end 1322 can be bounded by one or more doors through which people can access the interior 1326 of the trailer.

Adjacent the front end 1324 there is an exhaust fan 1308 mounted through a sidewall of the trailer 1300. The exhaust fan 1308 is also mounted adjacent the ceiling 1320. The exhaust fan 1308 can have pressure responsive vanes covering the exterior side of the exhaust fan which are normally closed, but open in response to the pressure of air being blown by the exhaust fan 1308 in order to minimize intrusion into the trailer by weather, insects, road debris, etc. Further, when the exhaust fan 1308 is activated, fresh air vents 1310 at the rear end (e.g. through the door(s)) allow outside air to be drawn into the interior 1326 of the trailer 1300. The fresh air vents 1310 can also have pressure responsive vanes that are normally closed but which open in response to air being drawn into the interior 1326 of the trailer 1300 by the exhaust fan 1308.

A control module 1312 controls operation of the exhaust fan 1308, and is coupled to one or more sensors including at least a temperature sensor. While the trailer 1300 is disconnected from a truck unit, the power source of the truck unit is not available. Therefore, an electrical connector 1314 is provided at the rear end of the trailer 1300 that can be connected to a power cable. This allows a warehouse or similar facility to provide power to the purge system when there is no truck unit to power the purge system. Thus, the purge system shown here is substantially the same as that of FIGS. 1-2, but without a duct. The same type of sensors, control module, fresh air vents, exhaust fan, antennas, etc. can be used to purge the trailer 1300 when necessary to improve the conditions inside the trailer 1300, without dumping the heated air into a warehouse facility.

The various purge system embodiments described herein can be retrofit into existing trailers/containers. It is also contemplated that trailers/containers can be manufactured with purge systems built into them. A duct is not necessary, but can provide a measure of efficiency as it ensure the most heated air at the ceiling of the trailer is removed first, along the length of the trailer. But in some applications, a duct may otherwise occupy useful space within the trailer and so should be omitted. The purging can be accomplished with either ambient air or conditioned air, and the fresh air intakes can be passive or coupled to a fan unit that blows air into the trailer through the fresh air intakes.

A purge system for a box trailer has been shown and described in which the interior of the box trailer can be purged with fresh air or conditioned air at a warehouse or similar facility before the box trailer is opened for unloading or loading. This prevents the common problem of thermal "dumping" when box trailers are opened at warehouses, and the heated air inside the trailer escapes into the warehouse. In large warehouse operations this problem is significant and can produce sub-optimal working conditions in the warehouse. Further, as is well known, working going in and out of a hot trailer can experience heat exhaustion. The disclosed purge system greatly reduces, if not eliminates these problems by purging the interior of the box trailer with fresh air or conditioned air before opening the trailer.

The inventive disclosure relates to a system and method of replacing a hazardous air mass within a confined space such as a trailer or shipping container, with an alternative air mass that will provide thermal comfort and safety to personnel and prevent hazardous air mass infiltration into connected buildings. The method includes monitoring of the confined space to determine air mass conditions, exhausting the hazardous air mass and replacing the air mass with an alternative one from the exterior of the trailer or from the connected building. The system and method are stopped when the conditions of the trailer air mass is equivalent to that of the alternative air mass. The trailer door is then opened for service such as loading or unloading by personnel.

The claims appended hereto are meant to cover all modifications and changes within the scope and spirit of the present invention.

What is claimed is:

1. A container fast purge system for a container having a first side and a second side opposite the first side, a first end and a second end opposite the first end, wherein the first side and the second side extend from the first end to the second end, comprising:
an exhaust vent through the first side at the first end of the container and positioned adjacent a ceiling of the container;
an exhaust fan positioned at the exhaust vent;
at least one fresh air vent through a portion of the container at the second end of the container;
a duct positioned in the container at a ceiling of the container, the duct having a front end coupled to the exhaust vent, a rear end located at the second end of the container, a rear intake vent at the rear end of the duct, and at least one intermediate intake vent in the duct between the front end and the rear end of the duct;
a temperature sensor disposed inside the container that is configured to provide a signal that indicates a temperature inside the container; and
a controller that is responsive to the signal of the temperature sensor to operate the exhaust fan until the temperature inside the container has decreased by a preselected amount or to a preselected temperature.

2. The container fast purge system of claim 1, wherein the at least one fresh air vent comprises a pressure operated vent that opens in response to a there being a lower pressure inside the container than outside the container.

3. The container fast purge system of claim 1, further comprising:
a wireless local radio communications transceiver operably coupled to the controller; and
a portable computing device that is configured to communicate with the wireless local radio communications transceiver to receive status information from the controller and to transmit operational commands to the controller.

4. The container fast purge system of claim 3, further comprising a camera mounted in an interior of the container, wherein the controller receives photographic information from the camera and transmits the photographic information to a portable communication device via the wireless local radio communications transceiver.

5. The container fast purge system of claim 1, wherein the at least one fresh air vent is configured, at an outside of the container, to connect to an external duct.

6. The container fast purge system of claim 1, further including a door switch operably coupled to the controller which indicates to the controller whether a door of the container is open or closed.

7. The container fast purge system of claim 1, further comprising an external temperature sensor mounted on an outside of the container and that is operably coupled to the controller to indicate an external temperature to the controller, and wherein the controller is further configured to operate the exhaust fan when a temperature differential between the external temperature and an internal temperature exceeds a preselected threshold.

8. The container fast purge system of claim 1, further comprising a gas sensor that is configure to sense a level inside the container of at least one gas and provide a signal to the controller indicating the level of the at least one gas.

9. A box trailer fast purge system, comprising:
a duct that has a front end near a front end of the box trailer, and a rear end of the duct near a rear end of the box trailer;
the duct having an intake vent at the rear end of the duct;
an exhaust vent through a side of the box trailer, the front end of the duct being coupled to the exhaust vent;
an exhaust fan positioned at the exhaust vent;
at least one intermediate intake vent on the duct between the front end of the duct and the rear end of the duct;
at least one fresh air vent through a portion of the box trailer at the rear end of the box trailer;
a temperature sensor disposed inside the box trailer that is configured to provide a signal that indicates a temperature inside the box trailer; and
a controller that is responsive to the signal of the temperature sensor to operate the exhaust fan until the temperature inside the box trailer has decreased by a preselected amount or to a preselected temperature.

10. The box trailer fast purge system of claim 9, wherein the at least one fresh air vent comprises a pressure operated vent that opens in response to a there being a lower pressure inside the box trailer than outside the box trailer.

11. The box trailer fast purge system of claim 9, further comprising:
a wireless local radio communications transceiver operably coupled to the controller; and
a portable computing device that is configured to communicate with the wireless local radio communications transceiver to receive status information from the controller and to transmit operational commands to the controller.

12. The box trailer fast purge system of claim 11, further comprising a camera mounted in an interior of the box trailer, wherein the controller receives photographic information from the camera and transmits the photographic information to a portable communication device via the wireless local radio communications transceiver.

13. The box trailer fast purge system of claim 9, wherein the at least one fresh air vent is configured, at an outside of the box trailer, to be connected to an external duct of a fan unit that blows air through the at least one fresh air vent.

14. The box trailer fast purge system of claim 9, further including a door switch operably coupled to the controller which indicates to the controller whether a rear door of the box trailer is open or closed.

15. The box trailer fast purge system of claim 9, further comprising an external temperature sensor mounted on an outside of the box trailer and that is operably coupled to the controller to indicate an external temperature to the controller, and wherein the controller is further configured to operate the exhaust fan when a temperature different between the external temperature and an internal temperature exceeds a preselected threshold.

16. The box trailer fast purge system of claim 9, further comprising a gas sensor that is configure to sense a level inside the box trailer of at least one gas and provide a signal to the controller indicating the level of the at least one gas.

17. A method of replacing undesirable environmental atmospheric conditions within a closed trailer, with desirable environmental conditions to safeguard building spaces and worker health before opening a trailer door of the trailer, the method comprising:
monitoring at least one interior condition of the trailer and obtaining a parameter value indicating a state of the at least one interior condition;

comparing the parameter value to a preselected threshold value;

when the parameter value meets or exceeds the preselected threshold value exhausting an interior air mass of the trailer, via an exhaust fan at an exhaust vent at a front of the trailer, while simultaneously drawing into the trailer a replacement air mass from outside the trailer though a vent at a rear of the trailer;

stopping the exhausting when the parameter value subsequently changes to a preferred value; and responsive to the parameter value changing to the preferred value, opening the trailer door by a user, the user then accessing an interior of the trailer.

18. The method of claim 17, further comprising transmitting the parameter value to a mobile device.

19. The method of claim 17, wherein the at least one interior condition includes a temperature of the interior of the trailer.

\* \* \* \* \*